C. DE L. RICE.
PNEUMATIC WHEEL.
APPLICATION FILED NOV. 28, 1908.
1,035,424.
Patented Aug. 13, 1912.
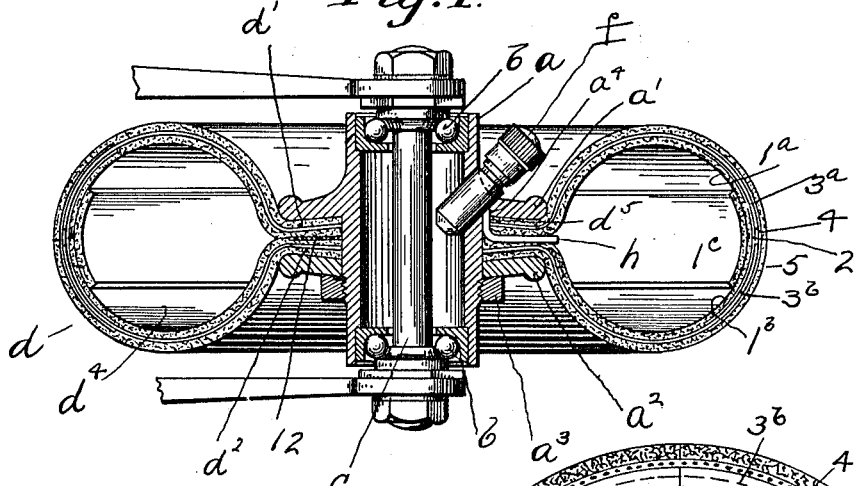
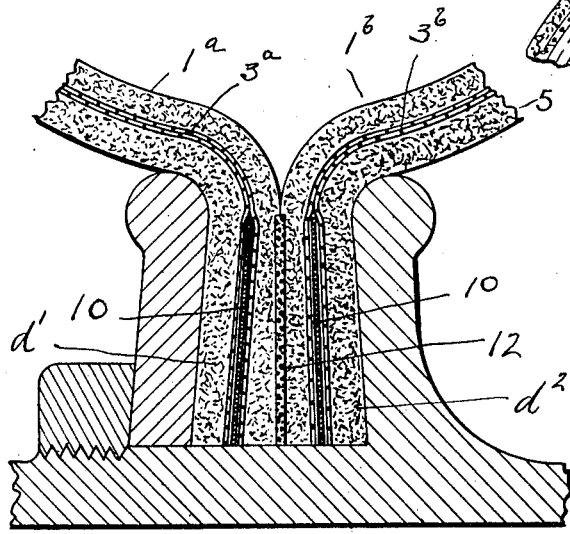
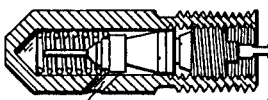
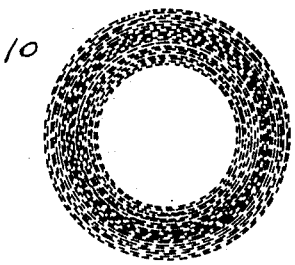
WITNESSES:
INVENTOR.
Charles De Los Rice
BY
his ATTORNEY.

UNITED STATES PATENT OFFICE.

CHARLES DE LOS RICE, OF HARTFORD, CONNECTICUT.

PNEUMATIC WHEEL.

1,035,424.     Specification of Letters Patent.     Patented Aug. 13, 1912.

Application filed November 28, 1908. Serial No. 464,855.

*To all whom it may concern:*

Be it known that I, CHARLES DE LOS RICE, a citizen of the United States, and a resident of Hartford, in the county of Hartford and State of Connecticut, have invented certain new and useful Improvements in Pneumatic Wheels, of which the following is a specification.

The pneumatic wheel herein illustrated and described was designed for use on roller skates. For such a use the wheels must be rather small in their diameter and this requires that the construction shall be such that the tire will stand up under a load without too much distortion and at the same time possess the desired yielding or resilient qualities. The construction is such that it is also adapted for other uses than for rollers for skates.

My invention relates particularly to the construction of the wheel as a whole, including a hub and a tire mounted on and secured directly to the hub without spokes or rim; also in the construction of the tire itself and the manner of inflating it.

Referring to the drawings—Figure 1 is a diametrical section through the complete wheel. Fig. 2 is a detail sectional view on enlarged scale. Fig. 3 is a sectional view of the valve. Fig. 4 is a side view of the reinforcing washer. Fig. 5 is a transverse sectional view of the tire at the tread portion.

Referring to the drawings $a$ is the hub mounted on ball bearings $b$ on the spindle $c$. The hub is provided with opposing flanges $a'$ $a^2$ between which the edges of the tire are to be clamped. One of these flanges $a'$ is preferably formed integral with the hub; the other flange $a^2$ has a sliding fit on the hub and is held in place in any desired manner, as by a clamping nut $a^3$.

$d$ is the tire made in the form of an endless casing open along its inner diameter. The inner diameter of the casing is of a size to slip into the hub between the flanges, the edges $d'$ $d^2$ of the casing being securely clamped between the flanges, as shown, forming an air-tight joint, in order that air under pressure may be held in the inflatable portion $d^4$ of the tire. In a tire of this construction, which is secured directly to the hub without the intervention of the usual rim and spokes, it has been found to be better practice to introduce the air into the tire in some other manner than by mounting a valve directly in the wall of the tire and I have provided for the inflation of the tire in the following manner. The shell of the hub is drilled and the valve $f$ is driven into this hole and secured in place, the axis of the valve lying at about an angle of forty-five degrees with the axis of the hub. A passage $f'$ is cut through the wall of the valve below the air inlet and is inclined at an angle of about forty-five degrees from the axis of the valve. The fixed flange $a'$ is pierced opposite this passage $f'$ in the valve, as at $a^4$, and one edge of the tire is notched, as at $d^5$, so that after this edge $d'$ of the tire is slipped onto the hub up against the fixed flange $a'$, with its notch in alinement with the hole through the flange, a tube $h$ may be passed through the notch $d^5$ and the hole $a^4$ and forced into the passage $f'$ in the valve. The end of the tube $h$ is then bent up at right angles so that its tip will just project into the inflatable part of the tire; the edge $d^2$ of the casing is then slipped onto the hub, the removable flange $a^2$ slipped onto the hub outside of the casing, and the edges $d'$ $d^2$ of the casing clamped between the flanges. In this way I am able to provide for the satisfactory inflation of the tire and at the same time for a tire with solid walls throughout.

Another part of my invention resides in the construction of the casing. Owing to the fact that the edges $d'$ $d^2$ are to be clamped together to form an air-tight joint to prevent the escape of air from the inflatable portion of the tire, it is desirable that there shall be no splicing or unevenness of thickness in these edges. The rubber jacket which forms the air chamber is made in two halves $1^a$ $1^b$ butted at the center line of the tread, a circumferential layer of rubber $1^c$ being applied to the interior thereof to cover the joint. On the outside of the jacket at the tread portion there is applied a circumferential strip of fabric 2 cut on a bias so as to readily conform to the curvature. A two-ply fabric envelop is next applied, it being formed in two halves $3^a$ $3^b$, which meet on the center line of the tread. A second circumferential strip of fabric 4 similar to the strip 2 is next laid onto the tread, covering the meeting edges of the envelop. The outside rubber casing 5 is then applied, it being preferably formed in halves which are butted at the center of the tread.

The manner of mounting this tire on the hub and securing it in place makes it necessary to provide a construction of the tire surrounding the central opening through it which shall not be elastic or stretchable in order to prevent the tire from working over one of the clamping flanges or from working loose so as to permit the air to escape. To accomplish this result I make use of a washer 10, illustrated in Fig. 4, which is formed by winding a thread upon itself. The washer is of the thickness of a single strand of thread but can be made of any diameter desired. When formed it is placed between two pieces of "friction-cloth", that is to say, cloth prepared with a rubber cement so as to retain it in its shape. The washer thus prepared has great resistance against stretching and one of these washers is located between the plies of the cloth envelops 3$^a$ 3$^b$, as indicated in section in Fig. 2. The tire as thus built up is then vulcanized. I prefer to insert a ring of raw rubber, indicated at 12, between the meeting faces of the tire in order to effectually seal this joint when the edges of the tire are clamped together.

This is a tire for direct application to the hub, of strong construction and which will support a load without excessive distortion.

In claim as my invention:

A pneumatic wheel comprising a hub, a fixed flange thereon, an inflatable tire casing pierced to fit said hub, open on its interior diameter and adapted to fit on said hub with its edges lying against said fixed flange, a valve mounted in said hub, a tube located between the edges of said tire casing and having one end bent to pass through said fixed flange into said valve, and a clamping flange secured to said hub and coöperating with said fixed flange to bind the edges of said casing together in an air-tight joint.

CHARLES DE LOS RICE.

Witnesses:
H. E. HART,
D. I. KREIMENDAHL.